US006658206B2

(12) United States Patent
Stampfli (10) Patent No.: US 6,658,206 B2
(45) Date of Patent: Dec. 2, 2003

(54) 35 MM PROMOTIONAL CAMERA AND A SYSTEM FOR PROMOTING CONSUMER LOYALTY

(75) Inventor: Urs Stampfli, Weston, FL (US)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/081,106

(22) Filed: Feb. 22, 2002

(65) Prior Publication Data

US 2003/0161618 A1 Aug. 28, 2003

(51) Int. Cl.$^7$ ............................................... G03B 17/02
(52) U.S. Cl. ........................................... 396/6; 396/536
(58) Field of Search ............................ 396/6, 388, 530, 396/535, 536, 539

(56) References Cited

U.S. PATENT DOCUMENTS

| | | | | |
|---|---|---|---|---|
| 4,226,517 A | * | 10/1980 | Skarman ........................ | 396/6 |
| 5,063,400 A | * | 11/1991 | Takei et al. .................... | 396/6 |
| 5,600,391 A | * | 2/1997 | VanDeMoere et al. ......... | 396/6 |
| 5,708,856 A | | 1/1998 | Cloutier | |
| 5,752,085 A | | 5/1998 | Cloutier et al. | |
| 5,761,542 A | * | 6/1998 | Lamphron et al. ............. | 396/6 |
| 5,903,789 A | * | 5/1999 | Zander et al. .............. | 396/411 |
| 5,903,791 A | | 5/1999 | Okada | |
| 5,946,517 A | * | 8/1999 | Kuhn et al. ................. | 396/535 |
| 5,991,547 A | * | 11/1999 | Baiera et al. ................. | 396/6 |
| 6,490,411 B1 | | 12/2002 | Mazzacani | |

OTHER PUBLICATIONS

Photo Marketing Association International Newline; Forever Camera Keeps Processing in the Lab; Mar. 15, 2000; www.pmai.org/newsline.htm.

Eckerd; Pre–loaded 35mm Manuel Camera with Flash; www.eckerd.com.

User instructions for Automatic APS Camera; made by Concord Camera Corp.

Joanne Roman Stump; U.S. Customs Service; Re: Lens–Fitted Film Packages, ITC Investigation No. 337–TA–406; Mar. 2000; HQ 468780.

Joanne Roman Stump; U.S. Customs Service; Re: Lens–Fitted Film Packages, ITC Investigation No. 337–TA–406; Mar. 27, 2000; HQ 468569.

Joanne Roman Stump; U.S. Customs Service; Re: Lens–Fitted Film Packages, ITC Investigation No. 337–TA–406; Mar. 27, 2000: HQ 468564.

* cited by examiner

Primary Examiner—Russell Adams
Assistant Examiner—Michelle Nguyen
(74) Attorney, Agent, or Firm—Scott L. Lampert; Kerry Sisselman (57) ABSTRACT

A camera and method for promoting consumer loyalty for film developing services is provided. A promotional camera including a film door latch is provided to a consumer. The latch for opening the film door is available to the consumer on the outside body of the camera, but is rendered inaccessible by a deterrent mechanism, such as an adhesive label or the like. The promotional camera is returned to a retailer for servicing including, pre-winding of the film onto a film spool prior to use. In use, after each film exposure is taken, the film advance wheel is used to rewind a single frame of film into the original film cartridge. After all pictures have been taken, the consumer returns the camera with the rewound film intact to the retailer. The retailer removes the deterrent mechanism, opens the camera, removes the film cartridge, replaces the film cartridge with an unexposed film cartridge, pre-winds the film onto the film spool, replaces the deterrent mechanism and returns the now pre-loaded camera to the consumer.

11 Claims, 12 Drawing Sheets

35 MM PROMOTIONAL CAMERA AND A SYSTEM FOR PROMOTING CONSUMER LOYALTY

FIELD OF THE INVENTION

The present invention relates to the field of cameras and, more particularly, to a camera which promotes consumer loyalty in the choice of film developing services.

BACKGROUND OF THE INVENTION

Many systems have been developed for encouraging consumers to return to a particular establishment for film developing services. In the past, such loyalty programs have provided free film replacement in exchange for the film being developed in their establishment. The free film was then loaded by the user into the user's own camera of choice.

The Forever Camera Co. of Boca Raton, Fla. announced a reloadable, reusable 35 mm camera that comes pre-loaded with film and a battery. When a customer purchases the camera from a "forever camera" retailer, the purchaser automatically becomes a member of the Forever Camera Club. As a member, the customer qualifies for free film and batteries whenever they bring the camera back to the lab for processing. Although offering an incentive to the consumer to return to a Forever Camera Club location for developing, the Forever Camera does not discourage in any way reloading of the film by the consumer, or taking the film to another retailer for developing. The Forever Camera is nothing more than a regularly configured 35 mm camera.

U.S. Pat. No. 5,708,856 to Cloutier and U.S. Pat. No. 5,752,085 to Cloutier et al. and assigned to Eastman Kodak Company, relate to a rental camera with a locking device to deter customer reuse after completed exposure. The '085 Cloutier et al. patent discloses a rental camera including a locking device with a key and keyhole arrangement. The Cloutier '856 patent includes a locking screw arrangement. Both Cloutier patents disclose rental cameras which are to be used by a customer for picture-taking and returned to a lender to unlock the film door and unload exposed film and replace with fresh film.

A loyalty camera and system has been offered by the present assignee wherein a camera has been sold requiring a special key or tool to open the film door and remove the film cartridge. The camera containing the exposed film must be returned to the retailer of purchase, who exclusively has the special key tool used to open the film door and remove the film cartridge. Additionally, in that system, the special key tool is further required for pre-winding the unexposed 35 mm film onto a film spool for use before the camera is returned to the consumer.

However, cameras with locking mechanisms require additional parts (i.e., the locking mechanisms) which increase the cost of the camera, and special tools to unlock the mechanisms, which sometimes get misplaced or lost. The Forever Camera concept does not include any film removal deterrent at all.

What is needed is a camera and system that provides a deterrent, but not a physical bar, to a consumer removing and replacing the film and taking a camera and film cartridge to a different retail establishment for developing. What is further needed is an inexpensive camera for promoting user loyalty. These objects, as well as others, are satisfied by the present inventions.

SUMMARY OF THE INVENTION

A camera and method for promoting consumer loyalty for film developing services is provided. A promotional camera including a film door latch is provided to a consumer. The latch for opening the film door is available to the consumer on the outside body of the camera, but is rendered inaccessible by a deterrent mechanism, such as an adhesive label or the like, but not a locking mechanism. The promotional camera is returned to a retailer for servicing including, pre-winding of the film onto a film spool prior to use. In use, after each film exposure is taken, the film advance wheel is used to rewind a single frame of film into the original film cartridge. After all pictures have been taken, the consumer returns the camera with the rewound film intact to the retailer. The retailer removes the deterrent mechanism, opens the camera, removes the film cartridge, replaces the film cartridge with an unexposed film cartridge, pre-winds the film onto the film spool, replaces the deterrent mechanism and returns the now pre-loaded camera to the consumer.

In one embodiment including a flash, the retailer additionally tests and/or replaces the camera battery.

These and other objects and advantages of the present invention will become more readily apparent in the description that follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred it being understood, however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The present inventions relate to a promotional camera and a method of using a promotional camera in a retail film developing loyalty program. The physical configuration and packaging of the camera discourages, but does not bar, the consumer from personally reloading film in the camera. The loyalty system of the present invention provides additional incentives to the consumer for returning the camera for film developing to the retailer from which the camera was purchased.

Referring now to FIGS. 1–8, a camera 10 includes an outer housing 11 having a front portion 12a and a film door 12b. The front portion 12a and the film door 12b are made as two separate pieces to facilitate manufacturing of the housing 11. It should be appreciated, however, that the housing may, alternatively, be comprised of any number of pieces. Additionally, the outer surfaces of the front and film doors 12a and 12b, respectively, may be contoured, if desired, to improve gripping capabilities and provide a more ergonomic and aesthetically pleasing design. In the preferred embodiment, the housing 11 is constructed of a lightweight, yet rugged plastic material, but may, alternatively, be constructed of an alloy material, a metallic material or any other suitable material.

Front portion 12a of housing 11 is adapted for connective engagement with the corresponding film door 12b. The two halves form a substantially light tight connection when assembled together. Further, the film door 12b is pivotally engaged with the front portion 12a by a hinge 25. A pair of hook members 26 are integrally formed on the film door 12b and engage an internal sliding latch 14. Actuation of the sliding latch 14 releases the hook members permitting the film door 12b to swing open on the hinge 25. A trigger portion 14a of the sliding latch 14 extending through an aperture in the outer housing 11 is operated to open the film door 12b.

Additionally, camera 10 includes a flash assembly 16, which is visible through the front portion 12a of the camera 10. The flash assembly 16 is powered by a power source, such as a 1.5 V AA battery placed in a battery compartment formed in the camera body.

A trigger button 13 is accessible through an opening disposed on the top face 12c of the housing 11. A film advance wheel 18 extends through the film door 12b of the camera 10. The film advance wheel 18 in the camera 10 actually serves to rewind the film (which is pre-wound before use onto a film spool in the camera) back into the original film cartridge.

Additionally, a film exposure counter 20 is visible through the top face 12c. Film exposure counter 20 indicates to the user the number of unexposed pictures remaining in the camera, which number is decremented when the film is advanced by the film advance wheel 18.

The film pre-wind crank 22 on the bottom face 12d of the camera 10 is used to pre-wind the film onto a spool in the film compartment before use. A battery compartment door is 24 additionally present on the bottom face 12d of the camera 10 to provide access to the battery compartment.

Figure 1:
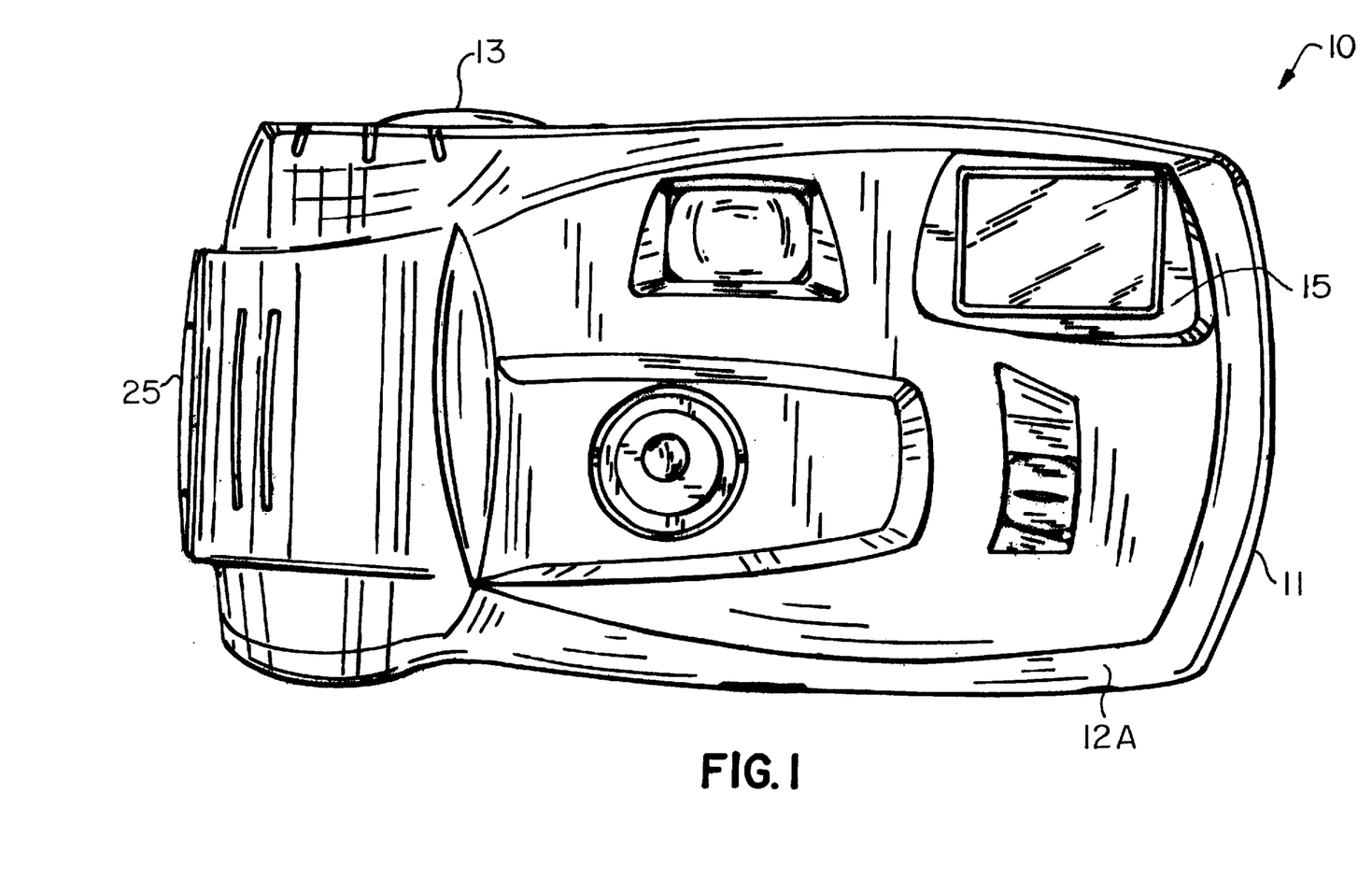
FIG. 1 is a front elevational view of an exemplary camera for use with the present invention.
Figure 2:
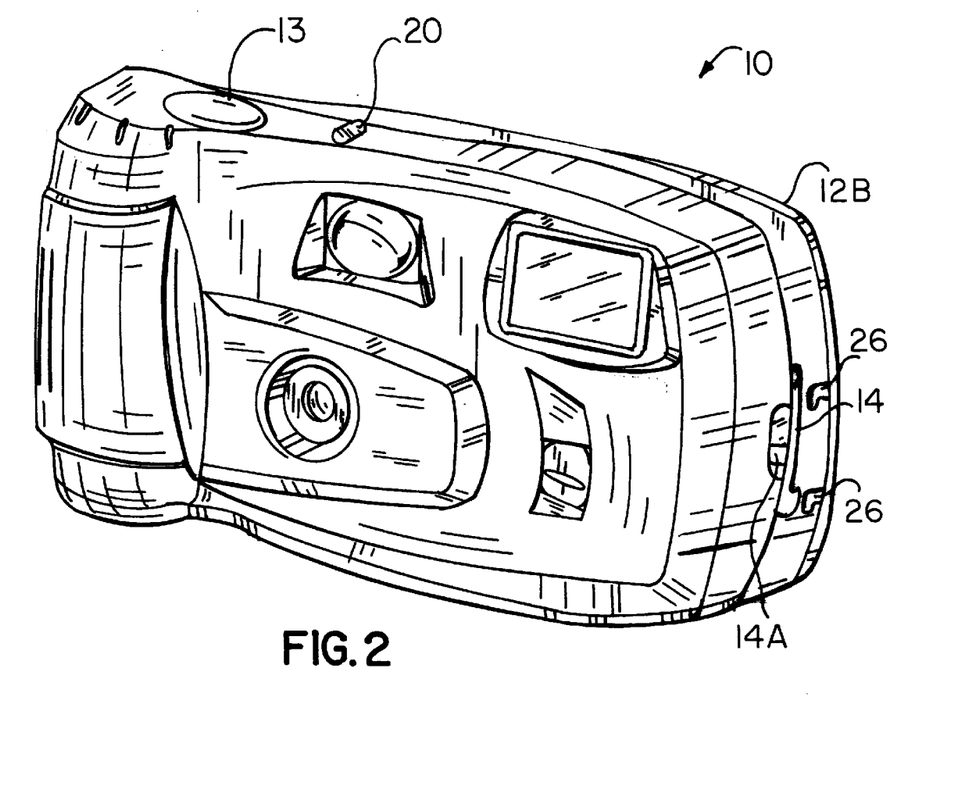
FIG. 2 is a front, top, right-side perspective view of the camera of FIG. 1.
Figure 3:
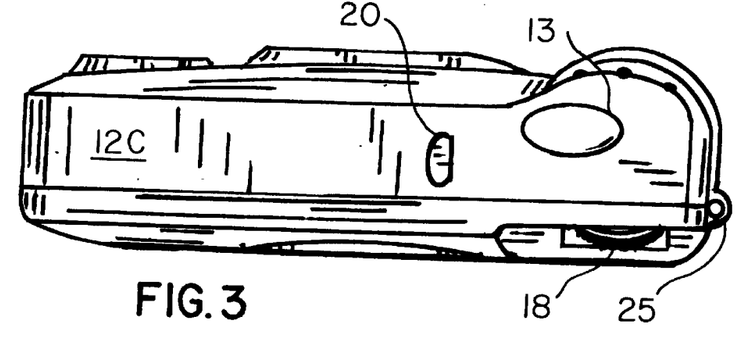
FIG. 3 is a reduced top plan view of the camera of FIG. 1.
Figure 4:
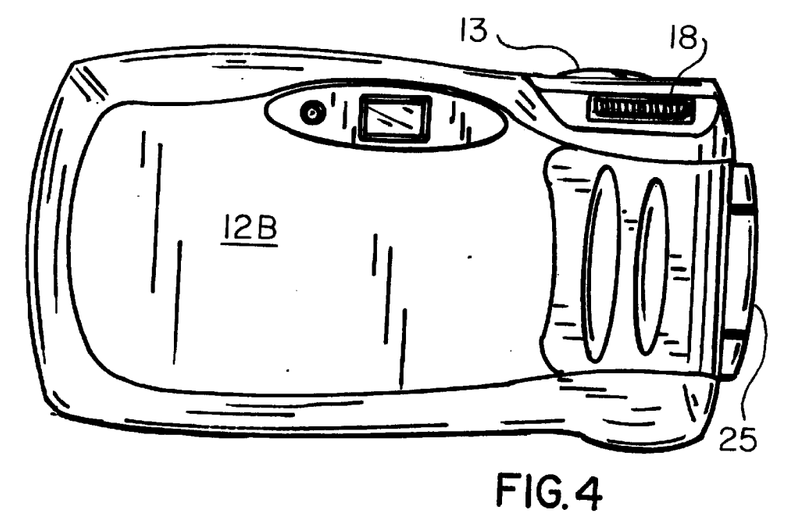
FIG. 4 is a reduced rear elevational view of the camera of FIG. 1.
Figure 5:
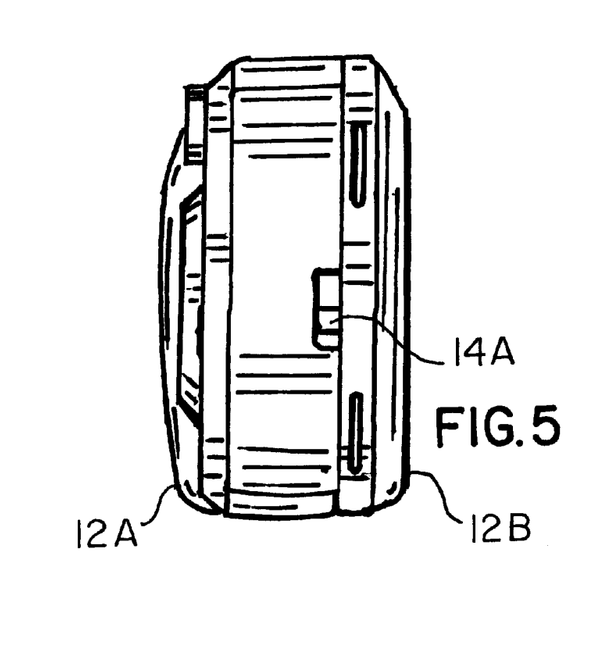
FIG. 5 is a reduced left side view of the camera of FIG. 1.
Figure 6:
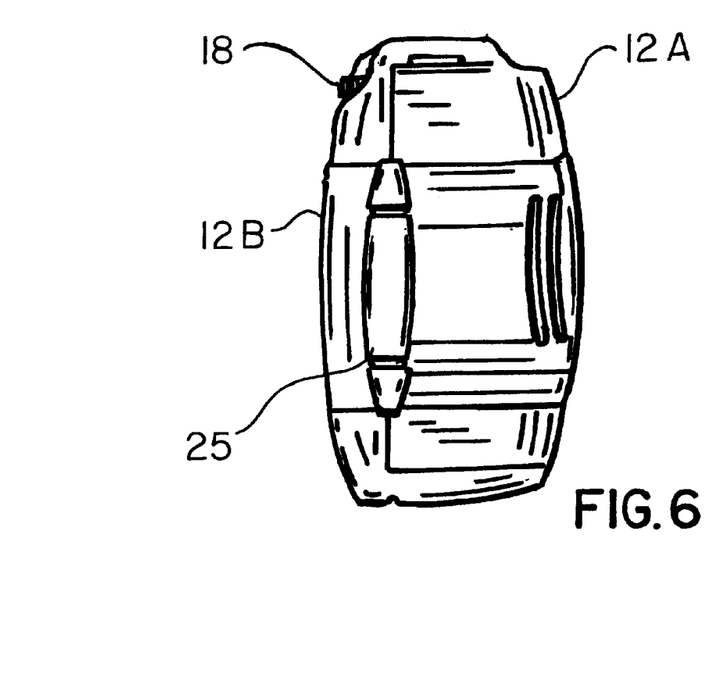
FIG. 6 is a reduced night side view of the camera of FIG. 1.
Figure 7:
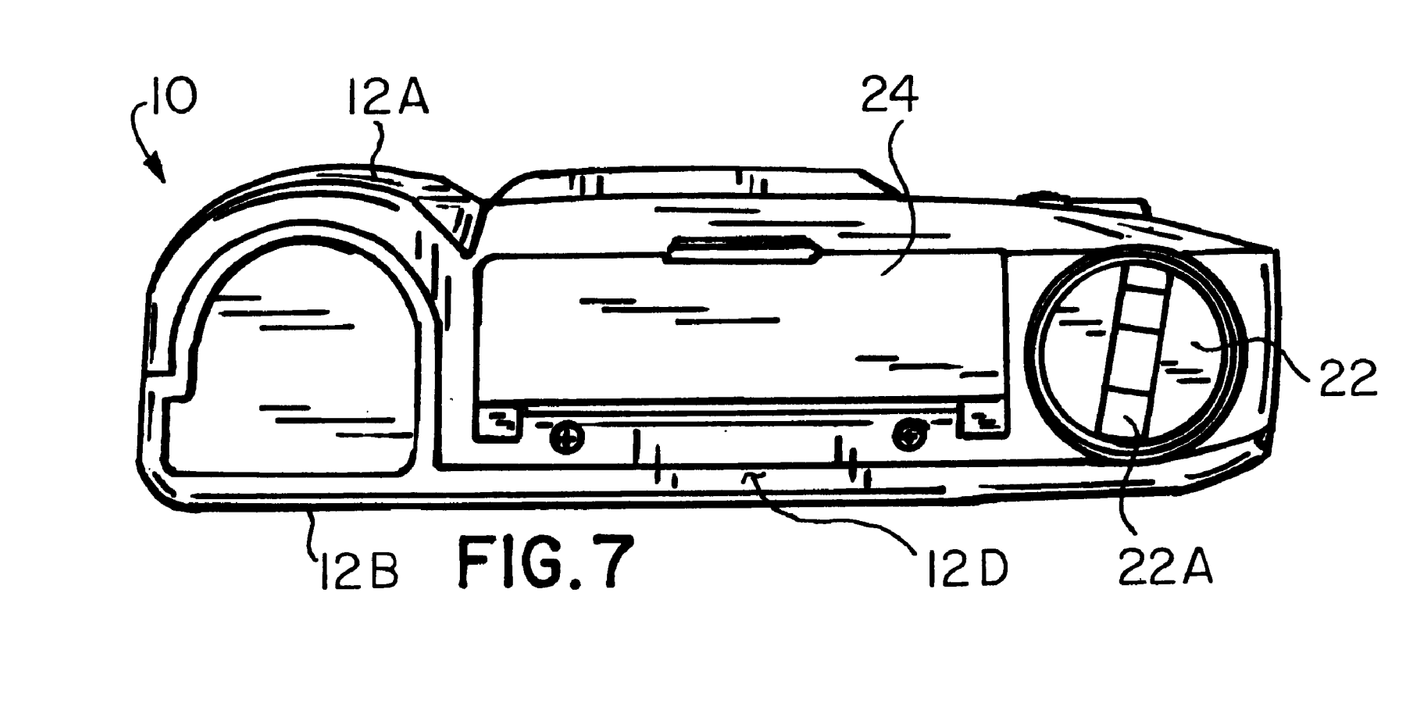
FIG. 7 is a reduced bottom plan view of the camera of FIG. 1.
Figure 8:
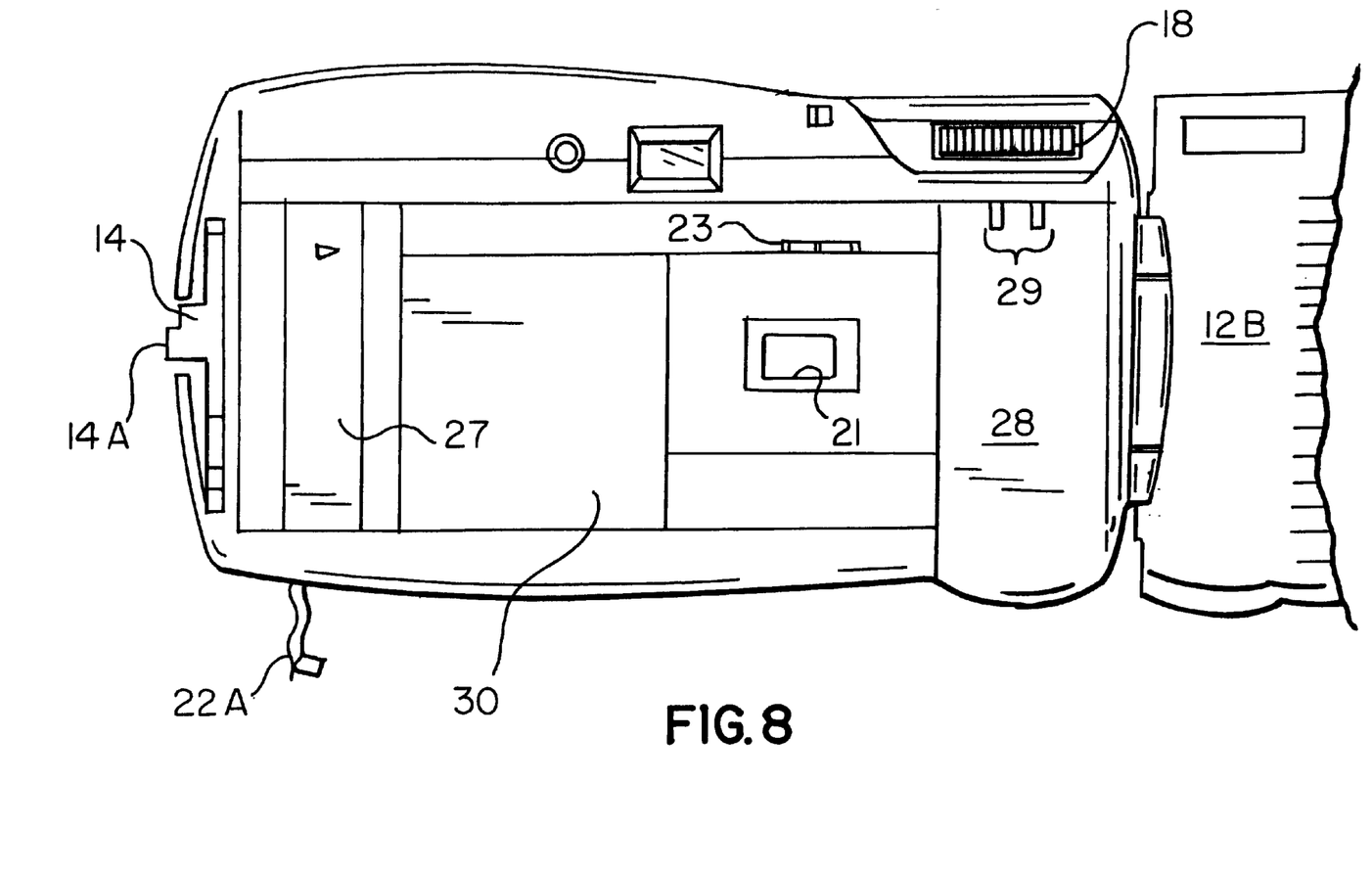
FIG. 8 is a rear perspective view of the inside back of the camera of FIG. 1 with the film door open.

Inside the outer housing 11 of the camera 10 is a body 30. The body 30 includes a film take-up reel 27 engaged with the film pre-wind crank assembly 22. Turning the crank 22a correspondingly drives the film take-up reel. Body 30 additionally includes a film cartridge chamber 28. Film advance wheel fingers 29 extend into the film cartridge chamber 28 from the bottom surface of the film advance wheel 18. A film sprocket 23 is contained in the body 30 to engage film extending from the film cartridge chamber 28 to the, film take-up reel 27.

Upon initial assembly, the camera 10 is pre-loaded with a film cartridge, such as a standard 35 millimeter film cartridge. The film leader from the cartridge is initially engaged with the empty film take-up reel 27 (passing over the sprocket 23 and the exposure shutter 21 in the body 30 of the camera 10. After engaging the leading edge of the film with the film take-up reel 27, the camera door 12b is closed, and the film is pre-wound onto the empty film spool using the film crank 22a of the film pre-wind crank assembly 22. A battery is also placed in the battery compartment through the battery compartment door 24. As such, the user buys the promotional camera 10 with the film pre-loaded, pre-wound and with a battery in the battery compartment.

Figure 9:
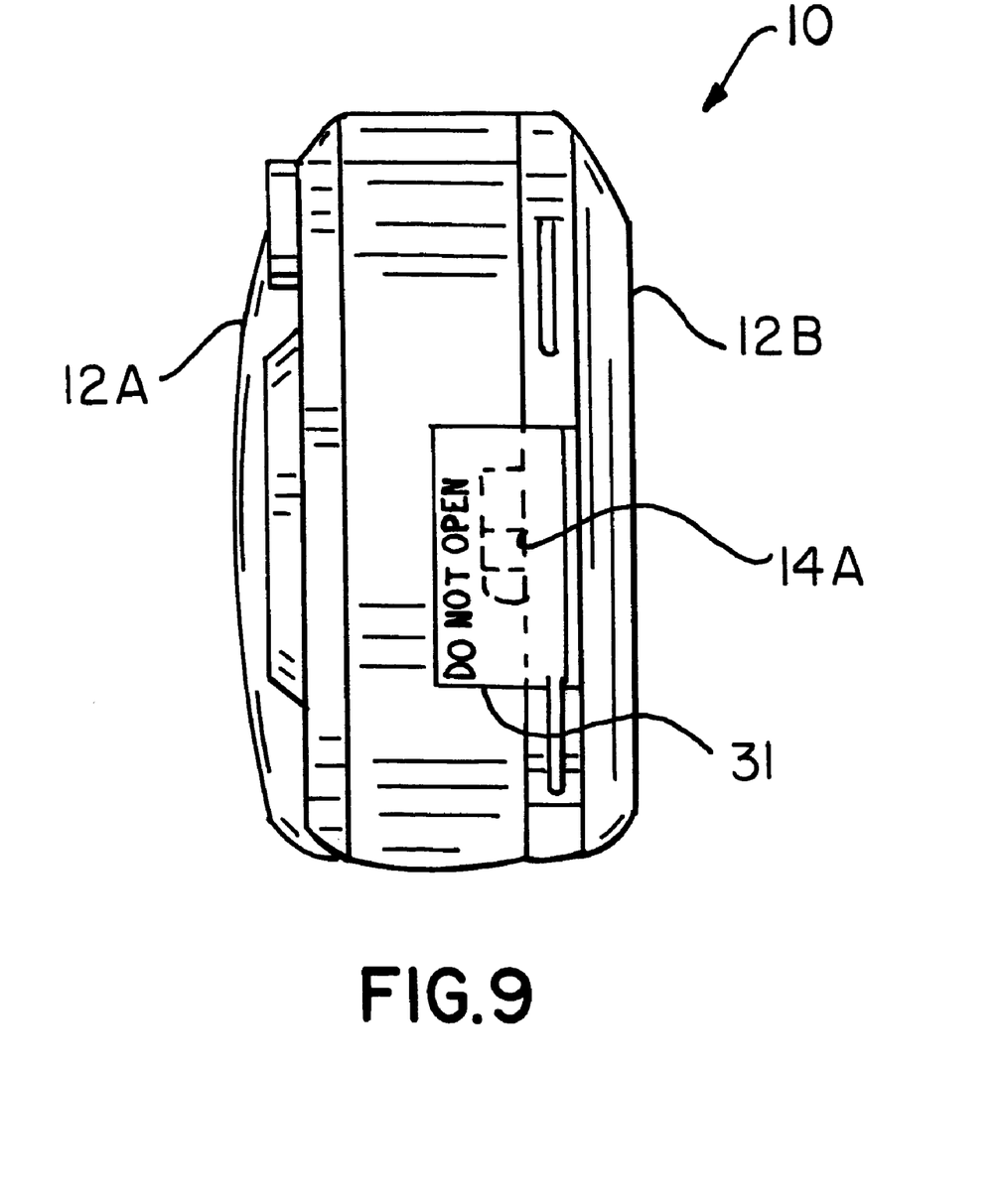
FIG. 9 is a left side view of a camera in accordance with one embodiment of the present inventions, wherein an adhesive label restricts access to the latch for opening the film door.
Figure 10A:
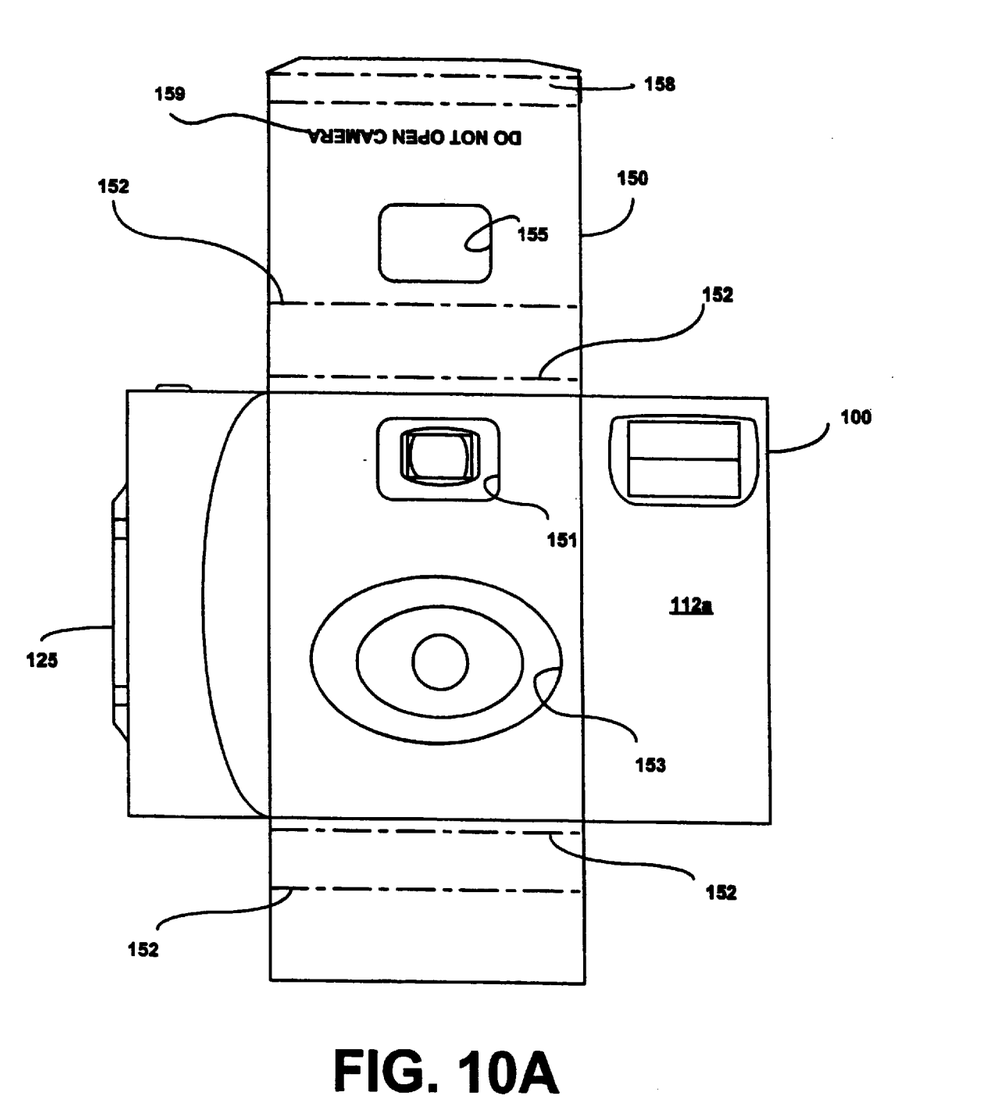
FIG. 10A is a front plan view of a camera and of one particular deterrent mechanism in accordance with another embodiment of the present invention.
Figure 10B:
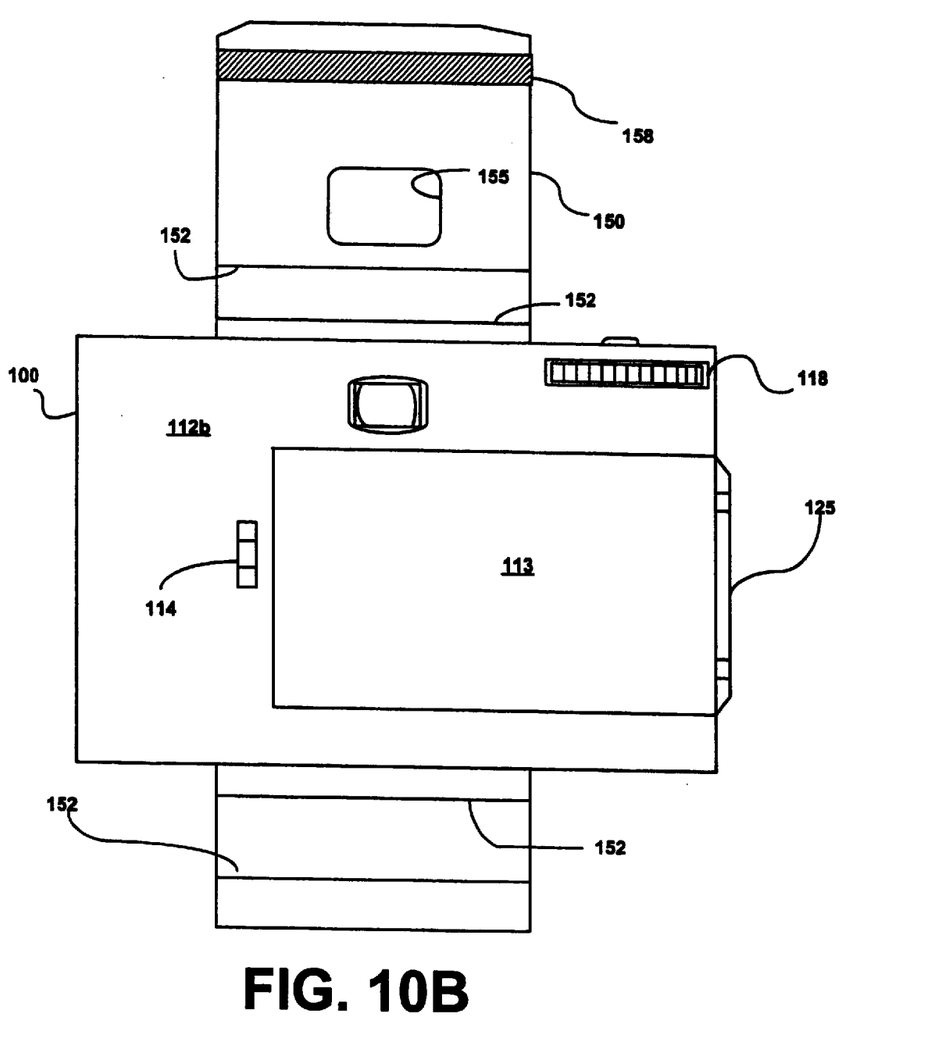
FIG. 10B is a rear plan view of a camera and of one particular deterrent mechanism in accordance with another embodiment of the present invention.

To deter the user from opening the film door to remove the used film cartridge and take it to another store for processing, a deterrent mechanism is provided. Referring now to FIG. 9, there is shown a side view of the camera 10 including a deterrent mechanism 31 placed over the sliding latch trigger 14a, and thus deterring the user from actuating the trigger latch 14a to open the camera door 12b. The deterrent mechanism 31 of FIG. 9 is a sticker or adhesive label placed over the camera trigger aperture. Preferably, a weak adhesive is used. The sticker or label may include a discouraging warning printed thereon or appended thereto, such as "Do not open camera" or "Offer void if sticker removed". Other means of discouraging the user from accessing the latch 14a can be used, such as a plastic, rubber or wax plug that prevents downward actuation of the latch trigger 14a and/or a plastic or rubber access door that snaps on or slides over the latch trigger 14a. Although the methods disclosed herein provide a deterrent to the user to prevent opening the film door, none of these methods actually bar the user from opening the film door, as do the prior art systems requiring actual keys or tools to access the film door latch and/or open the film door. None of the methods described herein require more than the users fingernail to gain access to the film door latch trigger. Wherein discussed herein, the term "without a tool" references the easy removal of the deterrent mechanism using only the hand of the user, unaided by any other external tool or key. The deterrent mechanism of the present invention, although physical, is mostly psychological. Additionally, in the preferred embodiment, the deterrent mechanism 31 removes the latch trigger 14a from the view of the consumer to further deter the user from operating the latch.

As an added deterrent, the promotional camera 10 of the present embodiment is not loaded in the same manner as a traditional 35 mm camera. Rather, the film must be pre-wound before use instead of rewound after use.

Further, the retail store selling the promotional camera of the present invention can provide incentives (i.e. free film, battery and camera servicing) to the user to get the user to return the film to the retail outlet for developing. The incentives are in addition to the above listed deterrents to the user to take the film elsewhere for processing.

Referring now to FIGS. 10A–10B and 11A–11C, there is shown a promotional camera 100 of another design, having an outer housing comprising a front portion 112a and a rear portion 112b, wherein the rear portion includes a film door 113 pivotally engaged with the rear portion by the hinge 125. Film door 113 is secured closed by a latch inside the camera housing, a latch portion 114 of which extends through the rear portion 112b of the outer housing. Similarly, the film advance wheel 118 additionally extends through the rear portion 112b. A deterrent mechanism 150 is provided, which is sized to fit around the camera 100 and bond to itself or the camera to form a sleeve 150' around the outer housing of the camera 100. The deterrent mechanism 150 is designed to render the film door latch inaccessible to the camera user without removing the sleeve 150'. Additionally, the deterrent mechanism 150 removes the latch trigger 114 from the view of the consumer. Note that as with the embodiments discussed above, the deterrent mechanism 150 may be removed without a key or tool. Rather, the sleeve 150' can be removed by the user, if desired, using only a fingernail.

The deterrent mechanism 150 of the present embodiment may be formed of paper, cardboard a thin sheet of plastic, or some other material as may be desired. The deterrent mechanism 150 includes openings 151 and 155 for the viewfinder lenses and an opening 153 to permit the portion of the housing 112a containing the taking lens to pass through the sleeve 150'. Additionally, if made from a cardboard or plastic, the deterrent mechanism 150 may be pre-scored at lines 152 to permit easy folding of the deterrent mechanism 150 to form a sleeve 150'. An adhesive strip 158 may be provided to allow the deterrent mechanism 150 to adhere to itself or the camera to form a sleeve. Alternatively, the entire inside surface of the deterrent mechanism 150 may be coated with an adhesive and the deterrent mechanism 150 applied over the outer housing of the camera 100 as a sticker or adhesive label. Additionally a discouraging notice 159 may be printed on the deterrent mechanism 150.

Figure 11A:
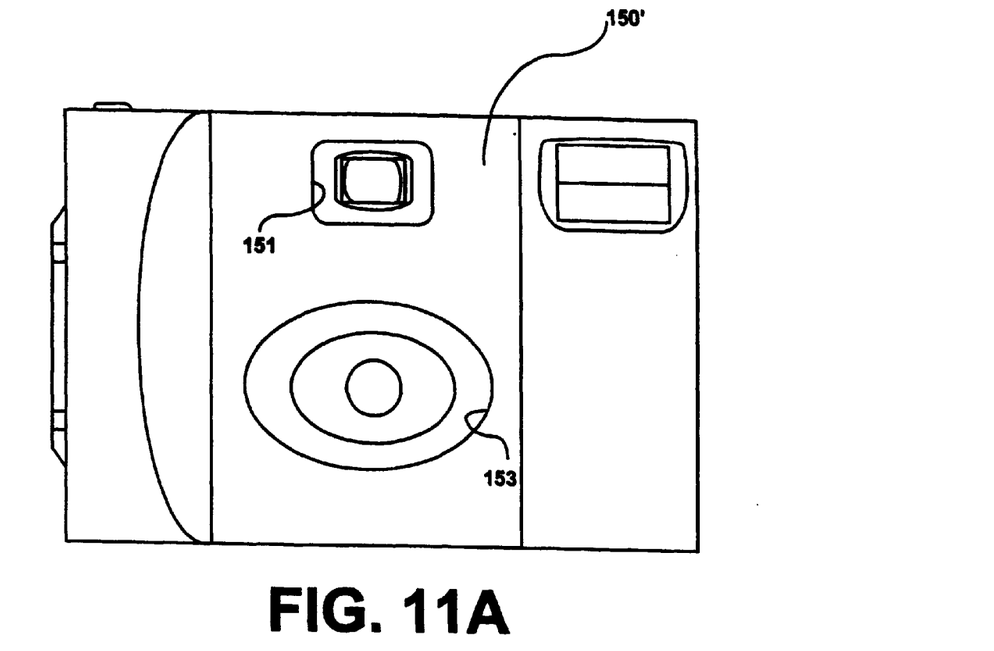
FIG. 11A is a front plan view of the camera of FIG. 9A in combination with a deterrent mechanism in accordance with one particular embodiment of the present invention.
Figure 11B:
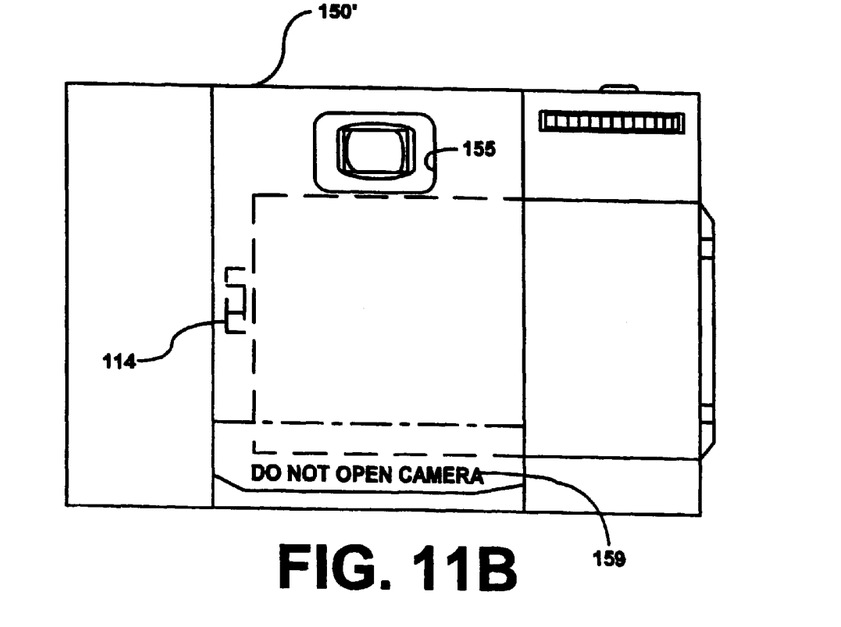
FIG. 11B is a rear plan view of the camera of FIG. 9B in combination with a deterrent mechanism in accordance with one particular embodiment of the present invention.
Figure 11C:
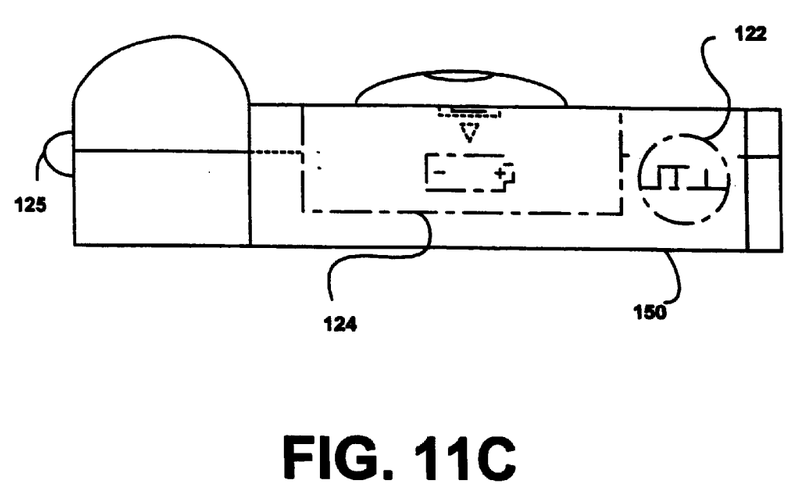
FIG. 11C is a bottom plan view of a camera in combination with a deterrent mechanism in accordance with one particular embodiment of the present invention.

Referring now specifically to FIG. 11C, one advantage of the deterrent mechanism 150 of the present embodiment is that the battery compartment door 124 can additionally be rendered inaccessible to the camera user by the sleeve 150'. Optionally, the sleeve 150' may be sized to render the pre-winding crank 122 inaccessible to the user as well.

Figure 12:
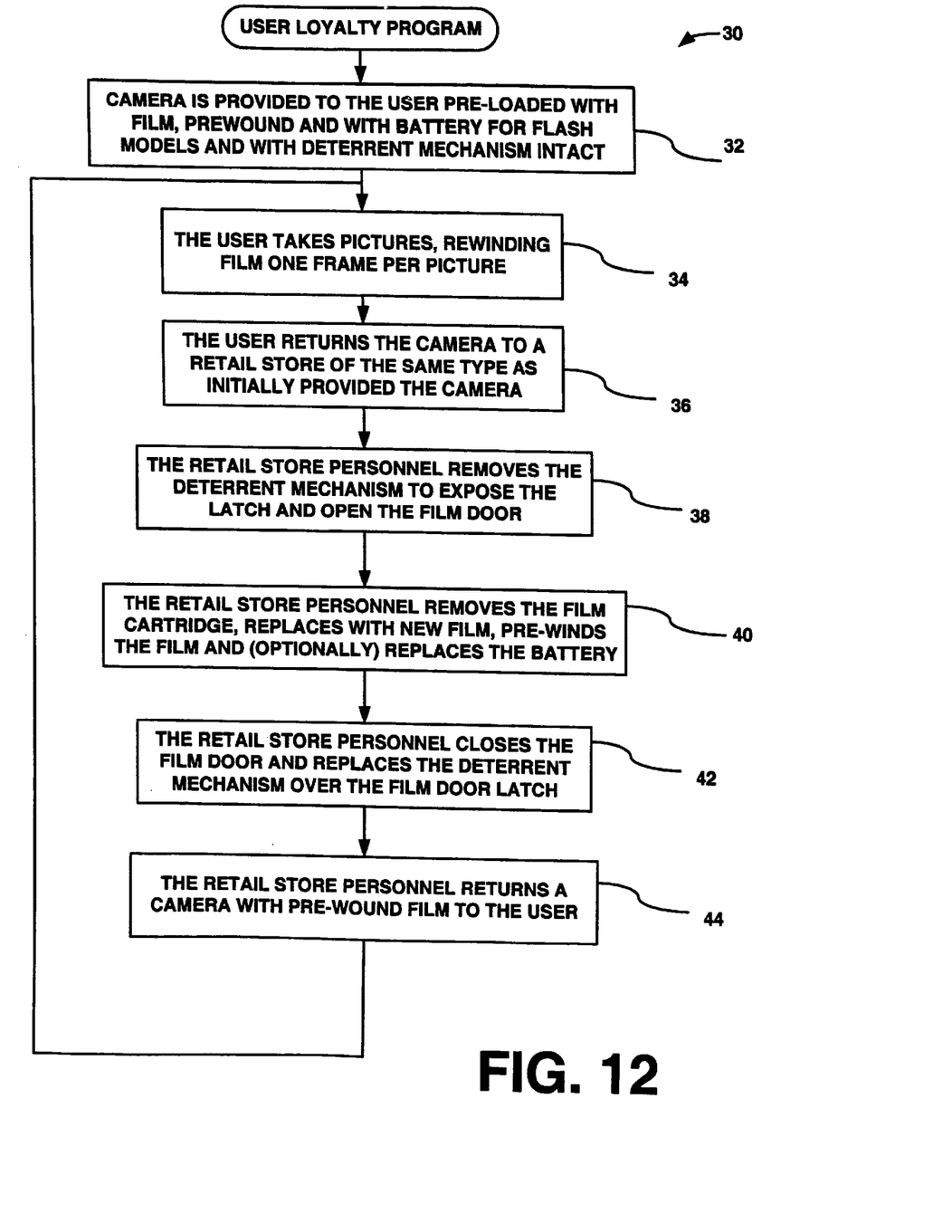
FIG. 12 is a flow diagram of a method of using a promotional camera in accordance with one embodiment of the present invention.

Referring now to FIG. 12, there is shown a flow diagram of a method 30 for promoting a user loyalty program for film developing services using a promotional camera, such as camera 10 of FIGS. 1–8. As described above, the user obtains the camera from a participating retail outlet. The camera may be purchased or the retailer may subsidize the cost of the camera in order to develop the loyalty and subsequent repeat business of the customer. The camera is initially provided to the user pre-loaded with film, which is pre-wound out of the original film cartridge and onto a film spool mounted in the camera. Additionally, for promotional cameras having a flash, a battery is pre-loaded in the battery compartment of the camera. A deterrent mechanism, such as the deterrent mechanism label 28 of FIG. 9 is provided over the film door latch trigger (14a of FIG. 8). Step 32.

The user then takes pictures with the promotional camera. After each exposure, the film advance wheel (18 of FIG. 4) is advanced which rewinds a single frame of the film into the original film cartridge. Step 34.

After the user has completed taking pictures with the camera, the user returns the camera to a retail store of the same type as initially provided the camera. Step 36. Alternatively, the user can return the camera to any retailer participating in the particular promotional offer.

The retail store personnel removes the deterrent mechanism to expose the film door latch and opens the film door. Step 38. The retail store personnel removes the previously rewound film cartridge and replaces it with a new film cartridge. The retail personnel then pre-winds the film for the user, thus saving the user the trouble of either pre-winding the unexposed film or rewinding the complete roll of exposed film at one time (as is done in conventional 35 mm cameras). Additionally, for models including a flash, the retail store personnel may test and/or replace the battery. Step 40.

The retail store personnel than closes the film door and places a deterrent mechanism over the film door latch. Step 42. The retail store personnel returns the pre-loaded, pre-wound camera to the user. Step 44. In the most preferred embodiment, the retailer provides the user with the same camera that the user returned to the retailer. In another embodiment, the retailer provides the user with an equivalent pre-loaded, pre-wound camera, i.e. one turned in by a different user and serviced earlier in the day, so that the user does not have to wait for his/her own camera to be serviced.

Thus, with the method and promotional camera of the present inventions, the retail store personal provides the convenience to the user of fully servicing the camera. The deterrent mechanism and pre-wind requirements of the promotional camera provide a psychological deterrent to the user to reload or service the camera themselves or at a different retail location. Additionally, the film and battery may be provided by the retailer free of charge to provide further incentives for the user to return to the retail store. In return, the retailer gains the loyalty of the customer and the customer's film developing business, as well as brings the customer back into the store to shop or browse for other products and services offered by the retailer during a film drop-off or pick-up visit and/or while waiting for the camera to be serviced.

While the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for using a promotional camera; comprising the steps of:
   (a) receiving a promotional camera from a retail outlet said promotional camera including a film door secured to said promotional camera at one end by a hinge and at a second, opposite end by a slideable film door trigger latch, said promotional camera including a deterrent mechanism located over said film door trigger latch;
   (b) taking pictures with said promotional camera;
   (c) returning said promotional camera to an affiliated retail outlet;

(d) selecting film developing services for purchase;

(e) providing said promotional camera to a retail store personnel;

(f) moving said deterrent mechanism located on the outside housing of said promotional camera to expose said film door trigger latch, at least a portion of which extends through the outer housing of said promotional camera;

(g) operating said film door trigger latch without a tool to open said promotional camera;

(h) removing an exposed, rewound film cartridge for which developing services were selected in step (d);

(i) loading an unexposed film cartridge in said promotional camera;

(j) closing said promotional camera;

(k) replacing a deterrent mechanism on the outside housing of said promotional camera over said film door trigger latch;

(l) returning said promotional camera to the user free of charge, wherein steps (f)–(l) are performed by personnel of the retail store.

2. The method of claim 1, wherein said deterrent mechanism is secured over said film door trigger latch using an adhesive.

3. The method of claim 2, wherein said deterrent mechanism consists essentially of an adhesive label.

4. A method for providing film processing services to a consumer at a retail outlet, comprising the steps of:

(a) providing a promotional camera to the consumer, said promotional camera being pre-loaded with film from a film cartridge, said promotional camera further including a film door to provide access to said film cartridge, said film door secured to said promotional camera at one end by a hinge and at a second, opposite end by a slideable film door latch trigger, said promotional camera further including a deterrent mechanism located over said film door latch trigger to render said film door latch trigger inaccessible to the consumer, said deterrent mechanism and said film door latch trigger being moveable without a tool;

(b) taking pictures with said promotional camera;

(c) returning said promotional camera to a retail outlet;

(d) moving said deterrent mechanism to provide access to said film door latch trigger;

(e) actuating said film door latch trigger to open said film door;

(f) removing the used film cartridge;

(g) placing an unexposed film cartridge in said promotional camera;

(h) closing said film door after step (g)

(i) pre-winding the majority of said unexposed film onto a film spool in said camera after step (h);

(j) placing a deterrent mechanism over said film door latch trigger after step (h); and (k) returning a pre-wound, pre-loaded promotional camera to the consumer after at least step (c), wherein steps (a), and (d)–(k) are performed by personnel of the retail outlet.

5. The method of claim 4, wherein said promotional camera returned to the consumer in step (k) is the same promotional camera returned by the consumer in step (c).

6. The method of claim 5, including the step of replacing a battery in said camera after step (c).

7. The method of claim 4 wherein at least a portion of said film door latch trigger passes through an outer housing of said promotional camera.

8. The method of claim 4, further including the step of selling said promotional camera to the consumer prior to step (a).

9. The method of claim 4, wherein said deterrent mechanism is secured over said film door trigger using an adhesive.

10. The method of claim 9, wherein said deterrent mechanism consists essentially of an adhesive label.

11. The method of claim 10, wherein said deterrent mechanism hides said trigger latch from view.

* * * * *